United States Patent
Omran et al.

(10) Patent No.: US 12,486,163 B1
(45) Date of Patent: Dec. 2, 2025

(54) HYDROGEN GENERATION METHOD FROM SODIUM BOROHYDRIDE USING CoO/CaSiO3@g-C3N4 NANOCOMPOSITE MATERIAL

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Mohamed Nady Abd El-Hameed Ibrahim, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/256,128

(22) Filed: Jun. 30, 2025

(51) Int. Cl.
*C01B 3/04* (2006.01)

(52) U.S. Cl.
CPC ........ *C01B 3/04* (2013.01); *C01B 2203/1052* (2013.01); *C01B 2203/1082* (2013.01)

(58) Field of Classification Search
CPC .............. C01B 3/04; C01B 2203/1052; C01B 2203/1082
See application file for complete search history.

(56) References Cited

U.S. PATENT DOCUMENTS

2016/0236177 A1* 8/2016 Backov ................ C04B 41/009
2023/0398530 A1 12/2023 Yong et al.

FOREIGN PATENT DOCUMENTS

| CN | 106076386 A | 11/2016 |
|---|---|---|
| CN | 109701581 A | 5/2019 |
| CN | 110721725 A | 1/2020 |

OTHER PUBLICATIONS

Zhiyong Mao, et al., "Novel g-C3N4/CoO Nanocomposites with Significantly Enhanced Visible-Light Photocatalytic Activity for H2 Evolution", ACS Applied Materials & Interfaces, vol. 9, Issue 14, Mar. 22, 2017, pp. 12427-12435, Abstract only, 1 page.

* cited by examiner

*Primary Examiner* — Paul A Wartalowicz
(74) *Attorney, Agent, or Firm* — Oblon, McClelland, Maier & Neustadt, L.L.P.

(57) ABSTRACT

A method of hydrogen generation from sodium borohydride ($NaBH_4$) using a $CoO/CaSiO_3$@$g$-$C_3N_4$ nanocomposite material includes hydrolyzing $NaBH_4$ in the presence of a $CoO/CaSiO_3$@$g$-$C_3N_4$ nanocomposite material, where the $NaBH_4$ reacts with water to form hydrogen ($H_2$) gas in the presence of the $CoO/CaSiO_3$@$g$-$C_3N_4$ nanocomposite material as a catalyst. Further, the $CoO/CaSiO_3$@$g$-$C_3N_4$ nanocomposite material includes hexagonal metal oxide nanoparticles that include a CoO phase and a $CaSiO_3$ phase dispersed on a matrix of $g$-$C_3N_4$ nanosheets. The hexagonal metal oxide nanoparticles have an average particle diameter in a range from 340 to 430 nm. The method of the present disclosure has a hydrogen generation rate of at least 40 $mL \cdot min^{-1} \cdot g^{-1}$.

20 Claims, 4 Drawing Sheets

HYDROGEN GENERATION METHOD FROM SODIUM BOROHYDRIDE USING CoO/CaSiO3@g-C3N4 NANOCOMPOSITE MATERIAL

BACKGROUND

Technical Field

The present disclosure is directed towards a hydrogen generation method, and, more particularly, towards a method for hydrogen generation from sodium borohydride with a CoO/CaSiO$_3$@g-C$_3$N$_4$ nanocomposite material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The rapid depletion of fossil fuel sources and a notable increase in atmospheric carbon dioxide ($CO_2$) emissions result from growing energy demands of modern society. Many people believe switching to renewable energy sources from nonrenewable ones, such as fossil fuels, is a practical way to lessen the energy crisis. To promote a more sustainable and ecologically friendly future, such a change attempts to lessen our need for carbon-intensive fossil fuels. This will help with various environmental issues, like pollution and global warming. Thus, the advancement of clean energy improves sustainable development. Because of its high energy density [142 megajoule per kilogram (MJ kg$^{-1}$)], non-toxicity, and environmental friendliness, hydrogen ($H_2$) has emerged as one of the most striking energy carriers among renewable sources. In addition, energy density of the $H_2$ (142 MJ/kg) is higher than that of liquid hydrocarbons, which have an energy density of 47 MJ/kg. $H_2$ may generally be kept in carbon-based materials as molecules, metal hydrides as atoms, in pressure vessels, and liquid hydrogen tanks. High-pressure hydrogen storage and liquefaction present several challenges that hinder the widespread implementation. One of the primary disadvantages is the high investment and maintenance costs required for the infrastructure, such as specialized high-strength cylinders designed to store $H_2$ at pressures up to 700 bar. These cylinders, often made of expensive materials like carbon fibre, are costly to produce and maintain. Additionally, the energy consumption associated with compressing $H_2$ to high pressures is substantial, as it requires large amounts of electricity to achieve the required compression, which adds to the operational costs. Furthermore, maintaining $H_2$ at high pressure increases the risk of gas leakage, posing both safety and efficiency concerns, as $H_2$ is highly flammable and may easily escape even with small defects in the storage system. Similarly, liquefaction of hydrogen, which involves cooling it to cryogenic temperatures around-253° C., requires a large energy input and specialized equipment to prevent boil-off, making the process both expensive and energy-intensive.

On the other hand, metal hydrides offer an alternative method for $H_2$ storage, but they come with their own set of limitations. While metal hydrides may absorb $H_2$ at lower pressures, the process of $H_2$ release requires elevated temperatures (often over 200° C.) to break the $H_2$-metal bond, making it inefficient for many applications. For example, the alloy lanthanum-nickel hydride (LaNi$_5$) may store $H_2$ effectively but requires heating to release the gas, consuming additional energy. Moreover, many metal hydrides are sensitive to air and moisture, which may degrade the performance and stability. The air sensitivity, along with the elevated temperature requirements for $H_2$ release, may limit the practical use as $H_2$ storage materials, including in applications where efficiency, safety, and cost are paramount.

Each of the aforementioned $H_2$ storage processes suffer from one or more drawbacks hindering their adoption. Accordingly, one object of the present disclosure is to provide methods and systems for $H_2$ storage that may circumvent the drawbacks, such as, high energy consumption, high investment, high-cost factor, of the materials known in the art.

SUMMARY

In an exemplary embodiment, a method of hydrogen ($H_2$) generation from sodium borohydride (NaBH$_4$) is described. The method includes hydrolyzing NaBH$_4$ in the presence of a CoO/CaSiO$_3$@g-C$_3$N$_4$ nanocomposite material, where the NaBH$_4$ reacts with water to form hydrogen ($H_2$) gas in the presence of the CoO/CaSiO$_3$@g-C$_3$N$_4$ nanocomposite material as a catalyst. Further, the CoO/CaSiO$_3$@g-C$_3$N$_4$ nanocomposite material includes hexagonal metal oxide nanoparticles that include a CoO phase and a CaSiO$_3$ phase dispersed on a matrix of g-C$_3$N$_4$ nanosheets. The hexagonal metal oxide nanoparticles have an average particle diameter in a range from 340 to 430 nm. The method of hydrolyzing NaBH$_4$ proceeds with a hydrogen generation rate of at least 40 mL·min$^{-1}$·g$^{-1}$.

In some embodiments, the method of hydrolyzing NaBH$_4$ proceeds with a hydrogen generation rate of at least 50 mL·min$^{-1}$·g$^{-1}$.

In some embodiments, the method of hydrolyzing NaBH$_4$ proceeds with a hydrogen generation rate of at least 60 mL·min$^{-1}$·g$^{-1}$.

In some embodiments, the method of hydrolyzing NaBH$_4$ proceeds with a hydrogen generation rate of at least 70 mL·min$^{-1}$·g$^{-1}$.

In some embodiments, the method of hydrolyzing NaBH$_4$ proceeds with a hydrogen generation rate of at least 200 mL·min$^{-1}$·g$^{-1}$.

In some embodiments, the method of hydrolyzing NaBH$_4$ proceeds with a hydrogen generation rate of at least 250 mL·min$^{-1}$·g$^{-1}$.

In some embodiments, the method of hydrolyzing NaBH$_4$ proceeds with a hydrogen generation rate of at least 300 mL·min$^{-1}$·g$^{-1}$.

In some embodiments, the method of hydrolyzing NaBH$_4$ proceeds with a hydrogen generation rate of at least 375 mL·min$^{-1}$·g$^{-1}$.

In some embodiments, the method of hydrolyzing NaBH$_4$ proceeds with a hydrogen generation rate of 80 mL·min$^{-1}$·g$^{-1}$ at 28° C.

In some embodiments, the method of hydrolyzing NaBH$_4$ proceeds with a hydrogen generation rate of 400 mL·min$^{-1}$·g$^{-1}$ at 38° C.

In some embodiments, the hexagonal metal oxide nanoparticles have an average particle diameter in a range from 370 to 410 nm.

In some embodiments, the hexagonal metal oxide nanoparticles have an average particle diameter in a range from 380 to 400 nm.

In some embodiments, the hexagonal metal oxide nanoparticles have an average particle diameter of 387 nm.

In some embodiments, the CoO/CaSiO$_3$@g-C$_3$N$_4$ nanocomposite material has a Brunauer-Emmett-Teller (BET) surface area of at least 20 m$^2$·g$^{-1}$.

In some embodiments, the CoO/CaSiO$_3$@g-C$_3$N$_4$ nanocomposite material has a BET surface area of at least 25 m$^2$·g$^{-1}$.

In some embodiments, the CoO/CaSiO$_3$@g-C$_3$N$_4$ nanocomposite material has a BET surface area of at least 30 m$^2$·g$^{-1}$.

In some embodiments, the CoO/CaSiO$_3$@g-C$_3$N$_4$ nanocomposite material has a pore volume of at least 0.10 cm$^3$·g$^{-1}$.

In some embodiments, the CoO/CaSiO$_3$@g-C$_3$N$_4$ nanocomposite material has a pore volume of at least 0.15 cm$^3$·g$^{-1}$.

In some embodiments, the CoO/CaSiO$_3$@g-C$_3$N$_4$ nanocomposite material has a pore volume of at least 0.195 cm$^3$·g$^{-1}$.

In some embodiments, the CoO/CaSiO$_3$@g-C$_3$N$_4$ nanocomposite material has an average pore diameter of 21.82 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
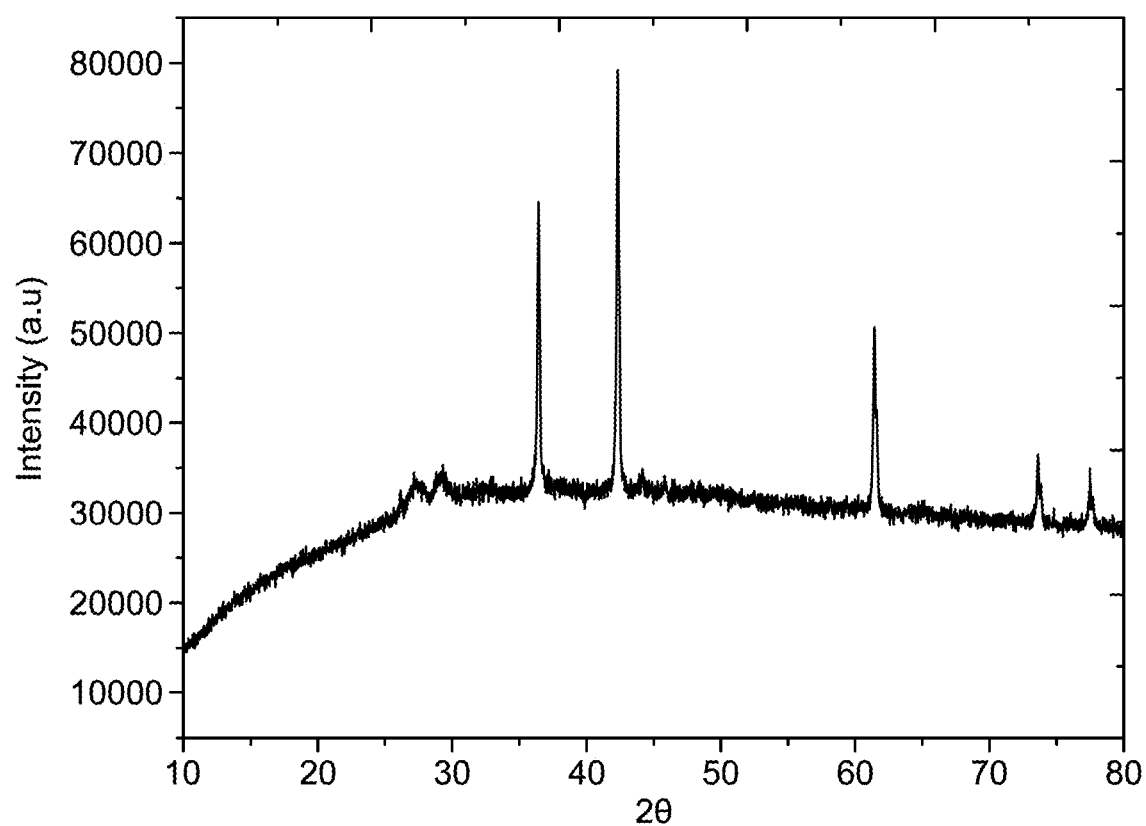
FIG. 1 depicts an X-ray diffractogram (XRD) of a CoO/CaSiO$_3$@g-C$_3$N$_4$ nanocomposite material, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'pore volume' refers to the total volume of void spaces (pores) within a material that is capable of being filled by a gas or liquid. It is typically expressed in cubic centimeters per gram (cm$^3$/g) and is a useful parameter in characterizing the porous structure of materials, such as adsorbents or catalysts.

A weight percent of a component, unless specifically stated to the contrary, is based on the total weight of the nanocomposite in which the component is included. For example, if a particular element or component in the nanocomposite is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include 160, 170, and 180. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a CoO/CasiO$_3$@g-C$_3$N$_4$ nanocomposite material designed to function as a catalyst to enhance the hydrolysis of sodium borohydride (NaBH$_4$) for efficient production of hydrogen gas. The catalyst facilitates the safe and rapid release of hydrogen from NaBH$_4$, making it an efficient solution for clean hydrogen production. The present disclosure circumvents the drawbacks of prior art by addressing limitations such as high catalyst costs, slow reaction rates, and environmental concerns. Traditional catalysts often require expensive materials, resulting in inefficient or slow hydrogen production. In contrast, the present disclosure uses a cost-effective catalyst that promotes faster hydrogen generation without relying on toxic or scarce materials. The simplicity of its preparation and its high catalytic activity also provides scalability and practical applicability, making it a more efficient and sustainable alternative to existing methods.

A nanocomposite material is described (CoO/CaSiO$_3$@g-C$_3$N$_4$). The CoO/CaSiO$_3$@g-C$_3$N$_4$ nanocomposite material includes hexagonal metal oxide nanoparticles that include a CoO phase and a CaSiO$_3$ phase dispersed on a matrix of g-C$_3$N$_4$ nanosheets. The hexagonal metal oxide nanoparticles have an average particle diameter in a range from 350 to 510 nm, preferably 340 to 430 nm, preferably 350 to 420 nm, preferably 360 to 415 nm, preferably 365 to 410 nm, preferably 370 to 410 nm, preferably 380 to 400 nm, preferably about 385 to 390 nm. In a preferred embodiment, the hexagonal metal oxide nanoparticles have an average particle diameter of about 387 nm.

In one or more embodiments, the CoO/CaSiO$_3$@g-C$_3$N$_4$ nanocomposite material has a mass ratio of the CoO:CaSiO$_3$:g-C$_3$N$_4$ phases in a range from 0.25-10:0.25-10:0.25:10, preferably 0.5-7.5:0.5-7.5:0.5-7.5, preferably 0.75-6:0.75-6:0.75-6, preferably 1-5:1-5:1-5.

In some embodiments, the CoO/CaSiO$_3$@g-C$_3$N$_4$ nanocomposite material is porous. Pores may be micropores, mesopores, macropores, and/or a combination thereof. The pores exist in the bulk material, not always in the molecular structure of the material. The term 'microporous' means that nanocomposites have pores with an average pore width (i.e. diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g. N$_2$ adsorption), mercury intrusion porosimetry, and imaging techniques such as scanning electron microscopy (SEM), and X-ray computed tomography (XRCT).

In some embodiments, a Brunauer-Emmett-Teller (BET) surface area of the CoO/CaSiO$_3$@g-C$_3$N$_4$ nanocomposite material is at least 10 m$^2$·g$^{-1}$, preferably at least 20 m$^2$·g$^{-1}$, preferably at least 25 m$^2$·g$^{-1}$, preferably at least 30 m$^2$·g$^{-1}$. In a preferred embodiment, the BET surface area of the CoO/CaSiO$_3$@g-C$_3$N$_4$ nanocomposite material is about 30.68 m$^2$·g$^{-1}$ The BET hypothesis is the foundation for a useful analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably N$_2$ adsorption analysis (e.g., N$_2$ adsorption isotherms).

In some embodiments, the average pore distribution of the CoO/CaSiO$_3$@g-C$_3$N$_4$ nanocomposite material may include, but is not limited to, crystalline average pore distribution, bimodal, trimodal, multimodal, narrow, broad, and Gaussian. In a preferred embodiment, the average pore distribution of CoO/CaSiO$_3$@g-C$_3$N$_4$ nanocomposite material is unimodal, indicating a single pore size population within the nanocomposite material.

In some embodiments, the CoO/CaSiO$_3$@g-C$_3$N$_4$ nanocomposite material has a pore volume of at least 0.075 cm$^3$·g$^{-1}$, preferably at least 0.10 cm$^3$·g$^{-1}$, preferably at least 0.15 cm$^3$·g$^{-1}$, preferably at least 0.195 cm$^3$·g$^{-1}$. In a preferred embodiment, the CoO/CasiO$_3$@g-C$_3$N$_4$ nanocomposite material has a pore volume of about 0.198 cm$^3$ g$^{-1}$.

In some embodiments, the CoO/CaSiO$_3$@g-C$_3$N$_4$ nanocomposite material has an average pore diameter of about 10 to 30 nm, preferably 15 to 25 nm, preferably 16 to 24 nm, preferably 17 to 23 nm, preferably 18 to 22 nm, preferably 19 to 22 nm, preferably 20 to 22 nm, preferably 21 to 22 nm. In a preferred embodiment, the CoO/CaSiO$_3$@g-C$_3$N$_4$ nanocomposite material has an average pore diameter of 21.82 nm.

In some embodiments, the CoO/CaSiO$_3$@g-C$_3$N$_4$ nanocomposite material may exist in various morphological shapes such as nanosheets, nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures. In a preferred embodiment, the CoO/CaSiO$_3$@g-C$_3$N$_4$ nanocomposite material is in the form of particles having a structure including a dispersion of hexagonal metal oxide nanoparticles on a two-dimensional porous structure, including curled and wrinkled nanosheets and platelets of g-C$_3$N$_4$.

In some embodiments, the CoO/CaSiO$_3$@g-C$_3$N$_4$ nanocomposite material is crystalline and includes a CoO phase, a CaSiO$_3$ phase, and g-C$_3$N$_4$.

A method of hydrogen generation from sodium borohydride (NaBH$_4$) is described. In some embodiments, other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof and with sodium borohydride may also be used.

The method includes hydrolyzing NaBH$_4$ in the presence of the CoO/CasiO$_3$@g-C$_3$N$_4$ nanocomposite material, at a temperature in a range from 15 to 60° C., preferably 20 to 40° C., preferably 28 to 38° C., wherein the NaBH$_4$ reacts with water to form H$_2$ gas in the presence of the CaO/CaSiO$_3$/g-C$_3$N$_4$ nanocomposite material acting as a catalyst.

In some embodiments, the hydrogen is generated at a hydrogen generation rate of at least 20 mL·min$^{-1}$·g$^{-1}$, preferably at least 40 mL·min$^{-1}$·g$^{-1}$, preferably at least 45 mL·min$^{-1}$·g$^{-1}$, preferably at least 50 mL·min$^{-1}$·g$^{-1}$, preferably at least 55 mL·min$^{-1}$·g$^{-1}$, preferably at least 60 mL·min$^{-1}$·g$^{-1}$, preferably at least 65 mL·min$^{-1}$·g$^{-1}$, preferably at least 70 mL·min$^{-1}$·g$^{-1}$, preferably at least 75 mL'min$^{-1}$·g$^{-1}$, preferably at least 80 mL·min$^{-1}$·g$^{-1}$. In one specific embodiment, the method of hydrolyzing NaBH$_4$ in the presence of the CoO/CaSiO$_3$@g-C$_3$N$_4$ nanocomposite material proceeds with a hydrogen generation rate of 80 mL·min$^{-1}$·g$^{-1}$ at 28° C.

In some embodiments, the hydrogen is generated at a hydrogen generation rate of at least 100 mL·min$^{-1}$·g$^{-1}$, preferably at least 200 mL·min$^{-1}$·g$^{-1}$, preferably at least 225 mL·min$^{-1}$·g$^{-1}$, preferably at least 250 mL·min$^{-1}$·g$^{-1}$, preferably at least 275 mL·min$^{-1}$·g$^{-1}$, preferably at least 300 mL·min$^{-1}$·g$^{-1}$, preferably at least 325 mL·min$^{-1}$·g$^{-1}$, preferably at least 350 mL·min$^{-1}$·g$^{-1}$, preferably at least 375 mL·min$^{-1}$·g$^{-1}$, preferably at least 400 mL·min$^{-1}$·g$^{-1}$. In one specific embodiment, the method of hydrolyzing NaBH$_4$ in the presence of the CoO/CasiO$_3$@g-C$_3$N$_4$ nanocomposite material proceeds with a hydrogen generation rate of 400 mL·min$^{-1}$·g$^{-1}$ at 38° C.

The following examples are provided solely for illustration and are not to be construed as limitations of the present disclosure, as many variations thereof are possible without departing from the spirit and scope of the present disclosure.

EXAMPLES

The following examples demonstrate CoO/CaSiO$_3$@g-C$_3$N$_4$ nanocomposite material as described herein. The examples are provided solely for illustration and are not to be construed as limitations of the present disclosure, as many variations thereof are possible without departing from the spirit and scope of the present disclosure.

Example 1: Fabricating the Calcium Silicate ($CaSiO_3$)

Equal moles of calcium nitrate (0.5 g) and sodium metasilicate (0.37 g) were dispersed in 100 milliliters (mL) of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 ml distilled water with an ultrasonic bath for 10 minutes, filtered via a Buchner system, rinsed with distilled water, and dried at 120° C. for 1 hour.

Example 2: Fabricating the Graphitic Carbon Nitride ($g-C_3N_4$)

About 30 grams (g) of urea ($NH_2CONH_2$) was placed in a 250 milliliters (mL) porcelain crucible and covered with its porcelain cover, then the crucible and cover were wrapped with three layers of aluminum foil to reduce the $NH_2CONH_2$ loss to sublimation. The crucible was heated via a furnace set at 600° C. for 45 min.

Example 3: Fabricating the CoO

About 10.0 cobalt (II) acetate and 5.0 g of xylose were placed in a 500 mL beaker. 100 mL distilled water was added to the mixture and heated until a clear solution was obtained. 10 mL of concentrated nitric acid was added to the mixture, which was then heated until the carbonization of xylose. The mixture was placed in an oven set at 120° C. for 3.0 h; the black product was milled in a mortar, placed in a 150 mL porcelain dish, and calcined at 550° C. for 4.0 h.

Example 4: Fabricating the $CoO/CasiO_3@g-C_3N_4$

An equal amount of $CaSiO_3$, $g-C_3N_4$, and CoO (0.5 grams each) was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for one hour. The product was dispersed in 1 L distilled water with an ultrasonic bath for 30 minutes, filtered via a Buchner system, rinsed with distilled water, and dried at 150° C. for 2.0 h.

X-ray diffraction (XRD) was used to examine the crystallinity and phase identification of the $CoO/CaSiO_3@g-C_3N_4$ nanocomposite material; the findings are shown in FIG. 1. The powder's high crystalline nature is shown by its sharp peaks and high intensity values. CoO is present as a primary phase together with $CaSiO_3$ and $g-C_3N_4$ as minor phases, according to an analysis of the diffraction patterns using standard JCPDS cards. The sharp peaks located at 2θ values of 36.5, 42.4, 61.5, 73.6 and 77.50 were well used to index the CoO cubic phase. These diffractions were originated respectively from (111), (200), (220), (311), and (222) plans of the cubic phase of CoO (Reference code No. 01-071-1178). Weak diffractions at 2θ values of 27.6, and 28.9° were used to detect the $CaSiO_3$ phase (Reference code No. 01-084-0655). Traces of quartz $SiO_2$ was detected at 2θ value of 27.30 (Reference code No. 01-079-1911). The g $C_3N_4$ diffractions were recorded at 61.4° (Reference code No. 01-087 1526). $CoO/CaSiO_3@g-C_3N_4$ was successfully fabricated since no further phases were found.

Figure 2A:
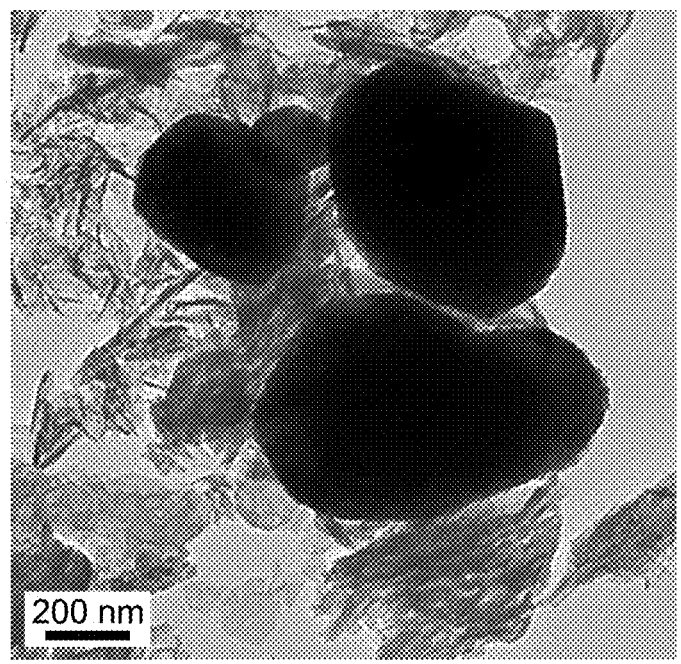
FIG. 2A depicts a transmission electron microscope (TEM) image of the CoO/CaSiO$_3$@g-C$_3$N$_4$ nanocomposite material, according to certain embodiments.
Figure 2B:
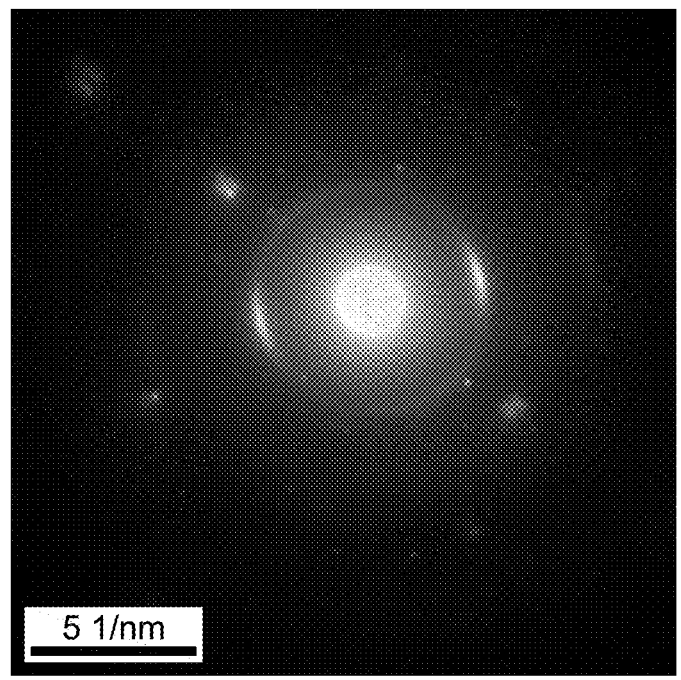
FIG. 2B depicts a selected area electron diffraction (SAED) pattern of the CoO/CaSiO$_3$@g-C$_3$N$_4$ nanocomposite material, according to certain embodiments.

A TEM image of $CoO/CaSiO_3@g-C_3N_4$ nanocomposite material is presented in FIG. 2A. The TEM image shows that a two-dimensional porous structure is formed with curled and wrinkled nanosheets and platelets of $g-C_3N_4$. The TEM image also shows well dispersed hexagonal shaped metal oxides nanoparticles with a size of 387 nm on the nanosheets of $g-C_3N_4$. The corresponding selected area electron diffraction (SAED) pattern reveals diffraction spots with interplanar spacing of 0.288 nm, 0.256 nm, 0.186 nm, and 0.142 nm due to ($CaSiO_3$: 131), (CoO: 111, $CaSiO_3$: 022), ($CaSiO_3$: –2-32), and (CoO: 220, $CaSiO_3$: –330, $g-C_3N_4$; 221) diffraction planes (FIG. 2B).

Figure 3A:
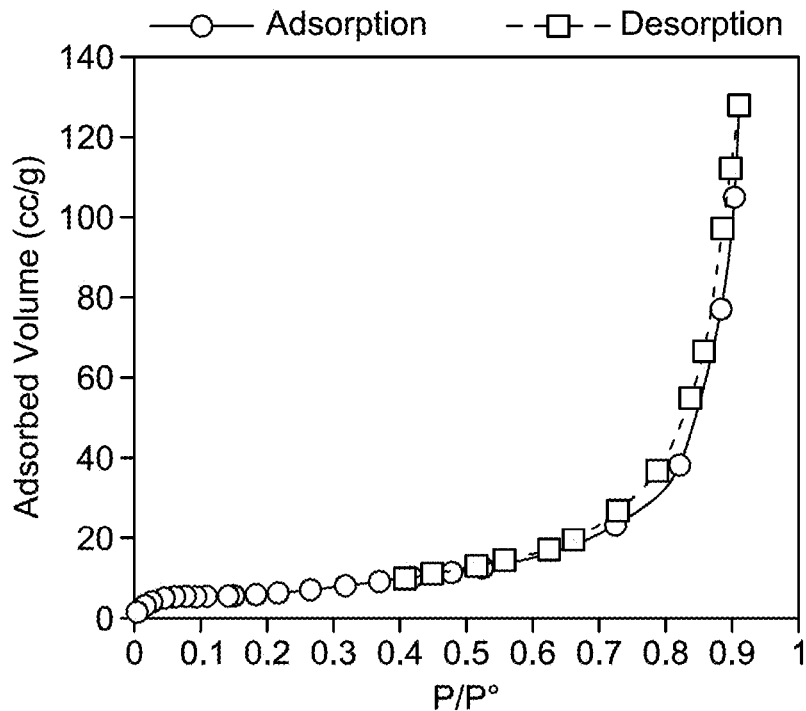
FIG. 3A depicts an adsorption-desorption isotherm of the CoO/CaSiO$_3$@g-C$_3$N$_4$ nanocomposite material, according to certain embodiments.
Figure 3B:
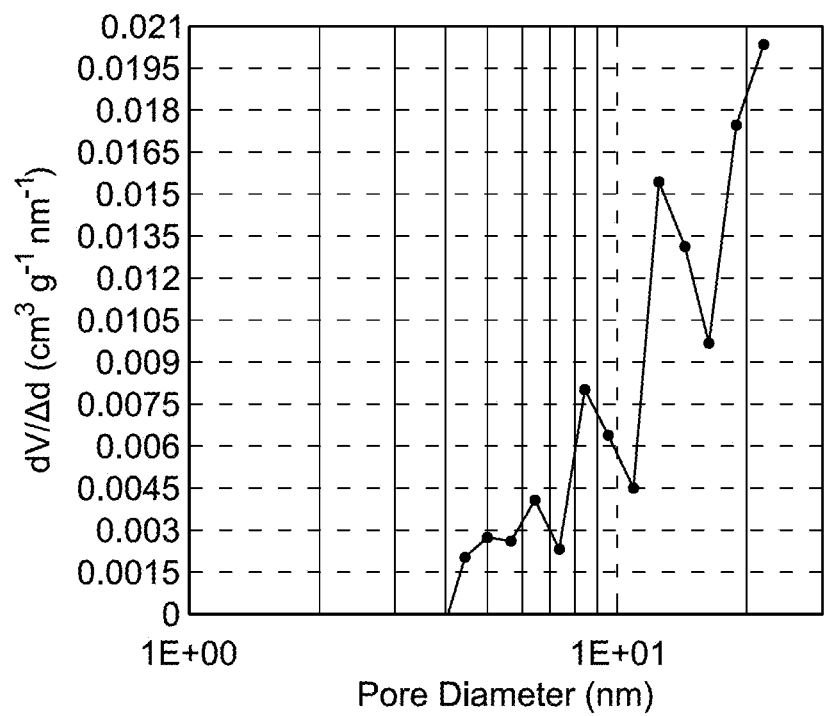
FIG. 3B depicts a pore size distribution curve of the CoO/CasiO$_3$@g-C$_3$N$_4$ nanocomposite material, according to certain embodiments.

FIG. 3A displays the nitrogen adsorption-desorption isotherms of the $CoO/CaSiO_3@g-C_3N_4$ nanocomposite material. The nitrogen sorption isotherm of the composite is type IV with a hysteresis loop, indicating the formation of mesoporous structures. However, shifting the loop to a relatively higher pressure (P/P0=0.66-1) indicates the presence of wide mesopores, which may result from the deposition of metal oxide particles in the wide pores of $g-C_3N_4$. Furthermore, the BET surface area of the $CoO/CaSiO_3@g-C_3N_4$ nanocomposite material was calculated to be 30.68 $m^2$ $g^{-1}$. The high specific surface area reflects the good dispersion of the metal oxide nanoparticles on $g-C_3N_4$.

Moreover, the pore size distribution curves, plotted using the BJH method, for the $CoO/CaSiO_3@g-C_3N_4$ nanocomposite material exhibited a unimodal distribution with average pore diameters maximized at 21.82 nm and a pore volume of 0.198 $cm^3$ $g^{-1}$. All the isotherms belong to category H3 type of pores, which do not exhibit limiting adsorption at high P/P° and arise due to aggregation of plate-like particles giving rise to slit-shaped pores. This indicates that the assembly of the $CoO/CaSiO_3@g-C_3N_4$ nanocomposite material produced a mesoporous array.

Figure 4:
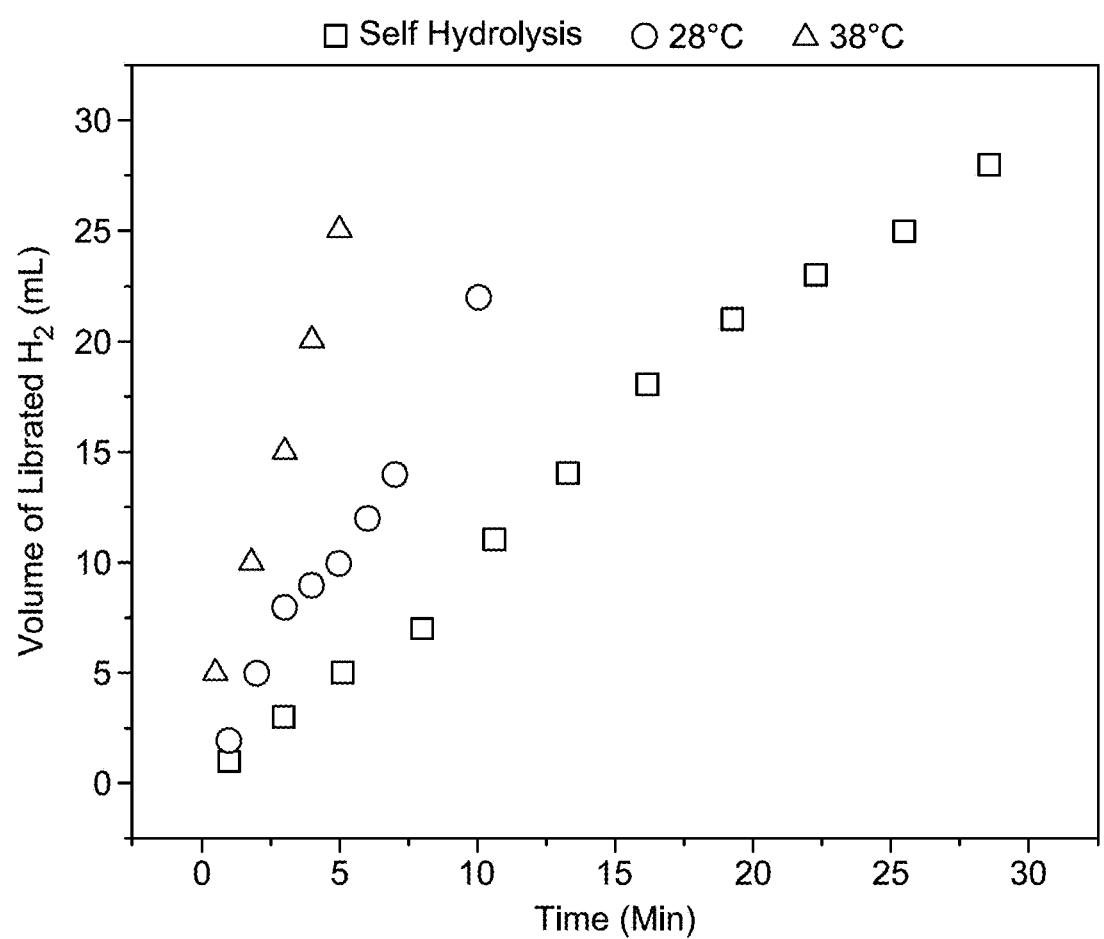
FIG. 4 depicts a variation of the volume of liberated H$_2$ with reaction time over the CoO/CaSiO$_3$@g-C$_3$N$_4$ nanocomposite material, according to certain embodiments.

The results of hydrolysis of $NaBH_4$ with and without the $CoO/CaSiO_3@g-C_3N_4$ nanocomposite material are shown in FIG. 4. The catalytic action of the $CoO/CasiO_3@g-C_3N_4$ nanocomposite material was clearly observed where the catalytic reaction exhibited higher activity than the self-hydrolysis process. According to the data analysis, hydrogen gas volume rises gradually over time. In addition, the catalytic hydrolysis reaction increases with increasing reaction temperature. Results demonstrate that, when using 0.7 g of $NaBH_4$, hydrogen generation values of 80.0 and 400 $mL \cdot min^{-1} \cdot g^{-1}$ were obtained at reaction temperatures of 28 and 38° C., respectively.

In the present disclosure, the $CoO/CaSiO_3@g-C_3N_4$ nanocomposite material was fabricated by a facile and low-cost method to function as a catalyst. The catalyst was characterized by XRD, TEM, and BET. XRD confirmed the successful fabrication of the $CoO/CaSiO_3@g-C_3N_4$ nanocomposite material. Further, the disclosure is focused on the $CoO/CaSiO_3@g-C_3N_4$ nanocomposite material being used as a catalyst for the generation of $H_2$ for use as a fuel from sodium borohydride. The catalytic activity revealed that the produced catalyst may hydrolyze the $NaBH_4$ with useful hydrogen generation rates of 40.0 and 200 $mL \cdot min^{-1} \cdot g^{-1}$ at reaction temperatures of 28 and 38° C., respectively.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of hydrogen generation, comprising:
   hydrolyzing $NaBH_4$ in the presence of a $CoO/CaSiO_3$@$g$-$C_3N_4$ nanocomposite material;
   wherein the $NaBH_4$ reacts with water to form $H_2$ gas in the presence of the $CoO/CaSiO_3$@$g$-$C_3N_4$ nanocomposite material as a catalyst; and
   wherein the $CoO/CaSiO_3$@$g$-$C_3N_4$ nanocomposite material comprises hexagonal metal oxide nanoparticles comprising a CoO phase and a $CaSiO_3$ phase dispersed on a matrix of $g$-$C_3N_4$ nanosheets,
   wherein the hexagonal metal oxide nanoparticles have an average particle diameter in a range from 300 to 500 nm, and
   wherein the hydrolyzing proceeds with a hydrogen generation rate of at least 40 $mL \cdot min^{-1} \cdot g^{-1}$.

2. The method of claim 1, wherein the hydrolyzing proceeds with a hydrogen generation rate of at least 50 $mL \cdot min^{-1} \cdot g^{-1}$, and wherein the hexagonal metal oxide nanoparticles have an average particle diameter in a range from 340 to 430 nm.

3. The method of claim 2, wherein the hydrolyzing proceeds with a hydrogen generation rate of at least 60 $mL \cdot min^{-1} \cdot g^{-1}$.

4. The method of claim 3, wherein the hydrolyzing proceeds with a hydrogen generation rate of at least 70 $mL \cdot min^{-1} \cdot g^{-1}$.

5. The method of claim 1, wherein the hydrolyzing proceeds with a hydrogen generation rate of at least 200 $mL \cdot min^{-1} \cdot g^{-1}$.

6. The method of claim 5, wherein the hydrolyzing proceeds with a hydrogen generation rate of at least 250 $mL \cdot min^{-1} \cdot g^{-1}$.

7. The method of claim 6, wherein the hydrolyzing proceeds with a hydrogen generation rate of at least 300 $mL \cdot min^{-1} \cdot g^{-1}$.

8. The method of claim 7, wherein the hydrolyzing proceeds with a hydrogen generation rate of at least 375 $mL \cdot min^{-1} \cdot g^{-1}$.

9. The method of claim 1, wherein the hydrolyzing proceeds with a hydrogen generation rate of 80 $mL \cdot min^{-1} \cdot g^{-1}$ at 28° C.

10. The method of claim 1, wherein the hydrolyzing proceeds with a hydrogen generation rate of 400 $mL \cdot min^{-1} \cdot g^{-1}$ at 38° C.

11. The method of claim 1, wherein the hexagonal metal oxide nanoparticles have an average particle diameter in a range from 370 to 410 nm.

12. The method of claim 11, wherein the hexagonal metal oxide nanoparticles have an average particle diameter in a range from 380 to 400 nm.

13. The method of claim 12, wherein the hexagonal metal oxide nanoparticles have an average particle diameter of 387 nm.

14. The method of claim 1, wherein the $CoO/CaSiO_3$@$g$-$C_3N_4$ nanocomposite material has a BET surface area of at least 20 $m^2 \cdot g^{-1}$.

15. The method of claim 14, wherein the $CoO/CaSiO_3$@$g$-$C_3N_4$ nanocomposite material has a BET surface area of at least 25 $m^2 \cdot g^{-1}$.

16. The method of claim 15, wherein the $CoO/CaSiO_3$@$g$-$C_3N_4$ nanocomposite material has a BET surface area of at least 30 $m^2 \cdot g^{-1}$.

17. The method of claim 1, wherein the $CoO/CaSiO_3$@$g$-$C_3N_4$ nanocomposite material has a pore volume of at least 0.10 $cm^3 \cdot g^{-1}$.

18. The method of claim 17, wherein the $CoO/CaSiO_3$@$g$-$C_3N_4$ nanocomposite material has a pore volume of at least 0.15 $cm^3 \cdot g^{-1}$.

19. The method of claim 18, wherein the $CoO/CaSiO_3$@$g$-$C_3N_4$ nanocomposite material has a pore volume of at least 0.195 $cm^3 \cdot g^{-1}$.

20. The method of claim 1, wherein the $CoO/CaSiO_3$@$g$-$C_3N_4$ nanocomposite material has an average pore diameter of 21.82 nm.

* * * * *